United States Patent
Vaarlid (10) Patent No.: US 11,436,179 B2
(45) Date of Patent: Sep. 6, 2022

(54) N-CHANNEL SERIAL PERIPHERAL COMMUNICATION, AND RELATED SYSTEMS, METHODS AND DEVICES

(71) Applicant: Microchip Technology Incorporated, Chandler, AZ (US)

(72) Inventor: Johan Vaarlid, Trondelag (NO)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 16/840,143

(22) Filed: Apr. 3, 2020

(65) Prior Publication Data

US 2021/0109886 A1    Apr. 15, 2021

Related U.S. Application Data

(60) Provisional application No. 62/913,521, filed on Oct. 10, 2019.

(51) Int. Cl.
*G06F 13/42* (2006.01)
*G06F 13/10* (2006.01)

(52) U.S. Cl.
CPC .......... *G06F 13/4282* (2013.01); *G06F 13/10* (2013.01); *G06F 2213/0002* (2013.01)

(58) Field of Classification Search
CPC ............... G06F 13/4282; G06F 13/10
See application file for complete search history.

(56) References Cited

U.S. PATENT DOCUMENTS

| | | | | |
|---|---|---|---|---|
| 10,318,179 B1* | 6/2019 | Er | .......................... | G06F 3/0659 |
| 2012/0166695 A1* | 6/2012 | Venus | .................. | G06F 13/4256 |
| | | | | 710/110 |
| 2013/0275636 A1* | 10/2013 | Decesaris | ........... | G06F 13/4291 |
| | | | | 710/110 |
| 2013/0332633 A1* | 12/2013 | Carney | ................. | G06F 13/385 |
| | | | | 710/48 |
| 2015/0293880 A1* | 10/2015 | Yoon | .................... | G06F 12/0238 |
| | | | | 710/308 |
| 2016/0132440 A1* | 5/2016 | Casady | ................. | G06F 13/385 |
| | | | | 710/308 |
| 2018/0365184 A1* | 12/2018 | van Wensen | ......... | G06F 13/364 |
| 2019/0196722 A1* | 6/2019 | Er | .......................... | G06F 3/0659 |
| 2019/0278736 A1* | 9/2019 | Aherne | ............... | G06F 13/4291 |
| 2020/0401549 A1* | 12/2020 | Usach Merino | .... | G06F 11/0772 |

OTHER PUBLICATIONS

Outgoing—ISA/210—International Search Report dated May 28, 2020 for WO Application No. PCT/US20/026708.
Outgoing Written Opinion of the ISA dated May 28, 2020 for WO Application No. PCT/US20/026708.

* cited by examiner

*Primary Examiner* — Phong H Dang
(74) *Attorney, Agent, or Firm* — TraskBritt (57) ABSTRACT

Embodiments of an N-channel serial peripheral interface are described, and N-channel serial communication links comprising the same. Also described are methods of communication using N-channel serial communication interfaces and links.

15 Claims, 7 Drawing Sheets

N-CHANNEL SERIAL PERIPHERAL COMMUNICATION, AND RELATED SYSTEMS, METHODS AND DEVICES

CROSS-REFERENCE TO RELATED APPLICATIONS

This application claims the benefit of the priority date of U.S. Provisional Patent Application No. 62/913,521, filed Oct. 10, 2019, and titled "N-channel Serial Peripheral Communication, and Related Systems, Methods and Devices," the disclosure of which is incorporated herein in its entirety by this reference.

FIELD

This description relates, generally, to data communication, and more specifically, some embodiments relate to N-channel serial communication and serial peripheral interfaces logically grouped to perform N-channel serial communication, including at a microcontroller, without limitation.

BACKGROUND

Microcontrollers and embedded systems more generally sometimes include one or more serial communication devices, such as a serial peripheral interface (SPI), for communication over various buses. Serial communication is generally understood to be particularly suited for long-distance data transfer and for cases where an amount of data (typically measured in bits or bytes), is relatively small.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, and symbols that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal. A person having ordinary skill in the art would appreciate that this disclosure encompasses communication of quantum information and qubits used to represent quantum information.

The various illustrative logical blocks, modules, and circuits described in connection with the embodiments disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, "symbol" means information represented by a number of binary bits (i.e., bit(s)), such as a byte (typically 8-bits) or a nibble (fewer than 8-bits). In a communication system, any number of bits may be pre-specified to represent symbols and information, however, in disclosed embodiments a sender and a recipient will typically have an understanding about the number of bits that constitutes a symbol. Non-limiting examples of information that may be represented by symbols includes application information, control information, and timing information. As used herein "data" means symbols or bits.

As used herein, "communication" means sending and/or receiving one or more symbols.

As used herein, "serial communication" means a process of communication of one or more symbols over an interconnect one bit at a time, in a sequence.

As used herein, references to elements (e.g., bits, bytes, symbols, or information more generally, without limitation) "communicated in parallel" or "parallel communication" of such elements, means simultaneous communication of the referenced elements (e.g., the symbols, without limitation) on different channels. Each such element may be communicated over a respective channel using serial communication. A channel may include one or more interconnects such as a wire, frequency band, or a combination thereof, without limitation. Two bits should be understood to be transmitted simultaneously if their transmission is triggered by the same clock edge of a common clock.

While symbols and bits may be described herein as communicated or transmitted "simultaneously," that should be understood to encompass bits and symbols that are and are not communicated or transmitted exactly simultaneously, such as bits and symbols that are communicated or transmitted during substantially contemporaneous transactions. A non-limiting example of substantially contemporaneous transactions are data transactions triggered by a same clock edge.

A serial peripheral interface (SPI) is a data transmission interface that may be configured for synchronous or asynchronous transmission of bits or symbols. An SPI may be or form a portion of a communication system that facilitates internal and/or external communication between devices, applications, and systems more generally. As a non-limiting example, an SPI may be or form a portion of a bus that facilitates serial communication between microcontrollers or between peripherals of a microcontroller.

Generally, an SPI communication link may include two SPI modules, an SPI master and an SPI slave, that are operatively coupled by an interconnect including a number of lines (e.g., wires for clock signals, transmit data, receive data, and control signals (e.g., slave select, without limitation), without limitation). An SPI master initiates and controls a data transaction. An SPI module of an SPI communication link may be configured as either a master or a slave, generally or for a specific data transaction.

An SPI module (e.g., such as a peripheral of a microcontroller configured as an SPI module, without limitation) may include shift registers, a master clock generator, and a number of input/output (I/O) connections (e.g., pins, without limitation) such as for data lines, a clock line, and select lines, without limitation.

By way of a non-limiting example of a communication using an SPI communication link, an SPI master initiates a communication cycle by pulling a desired slave select signal low. This signal is received by the desired SPI slave of the SPI communication link and informs the desired SPI slave that communication is desired. The SPI master and SPI slave prepare for the data to be sent from/to their respective shift registers, and the SPI master generates any required pulses of a clock signal on the clock line to exchange data. Data is shifted from the SPI master to the SPI slave on the master output/slave input (MOSI) line, and, in some cases, return data is shifted from the SPI slave to the SPI master on the master input/slave output (MISO) line.

Low power microcontrollers (e.g., microcontrollers used in applications that are power sensitive such as automotive networks and sensor networks or that are otherwise power constrained, without limitation) are often limited to clock speeds in the tens of megahertz range, and so in some cases the attainable transmission speeds by an SPI communication link are limited by the clock speed of a low power microcontroller. As a non-limiting example, in the case of a 20 MHz clock speed, a transmission speed by an SPI communication link may be limited to about 10 MHz in a low power application.

The inventor of this disclosure appreciates a need to improve transmission speeds of SPI communication links in microcontrollers, especially low power microcontrollers. The inventor of this disclosure appreciates that multiple SPI modules may be grouped (i.e., logically grouped) and the grouped SPI modules used to form an N-channel communication link for parallel communication, including as more fully described herein in connection with one or more embodiments.

One or more embodiments relate, generally, to an architecture for an N-channel communication link, and multi-input/output (multi I/O) communication using the same. In some embodiments, an N-channel SPI module includes N grouped SPI modules, clock source selection, and a communication driver configured to perform one or more functions associated with N-channel communication. The communication driver may be configured to synchronize a transmission by one or more first interface modules (e.g., managed SPI modules, without limitation) to a transmission by a second interface module (e.g., a managing SPI module, without limitation). In some embodiments, a communication driver may be configured to manage transfer of bits of a symbol to respective grouped SPI modules. In some embodiments, a communication driver may be configured to manage clock source selection at respective grouped SPI modules such that transmission at respective grouped SPI modules uses a common clock signal.

The communication driver may be configured to provide one or more first symbols to the one or more first interface modules, and provide a second symbol to the second interface module. Each symbol (i.e., of the first symbols and the second symbol) is individually communicated using serial communication but the group of symbols is communicated in parallel.

Figure 1:
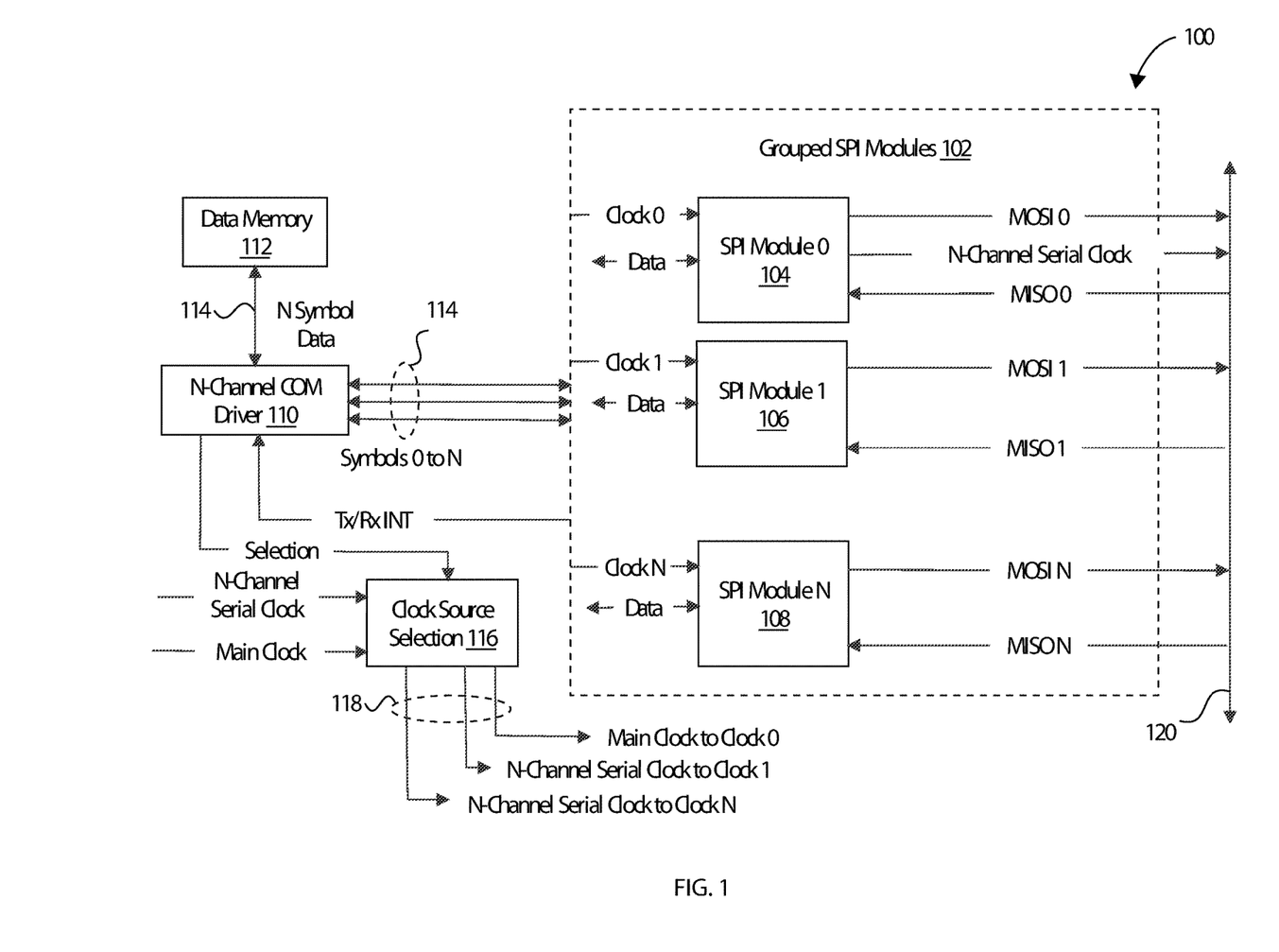
FIG. 1 illustrates a system configured as an N-channel serial peripheral interface module in accordance with one or more embodiments.

FIG. 1 shows a block diagram of a system 100 configured as an N-channel SPI module, in accordance with one or more embodiments. System 100 may also be characterized herein as "N-channel SPI module 100." As depicted by FIG. 1, system 100 may include grouped SPI modules 102 (which includes a number N SPI modules), N-channel communication (COM) driver 110, clock source selection 116, and data memory 112. Data memory 112 is optional, in other words, system 100 does not necessarily include data memory 112 but it is shown for ease of some of the discussion herein.

Each of SPI module 0 104 to SPI module N 108 of grouped SPI modules 102 may be configured as an SPI module for serial communication external to system 100 via interconnects 120 (e.g., for communication with an external device such as a memory or a computer system, without limitation). In a microcontroller implementation of system 100, the microcontroller may include one or more peripherals, each such peripheral configured (or configurable) as an SPI module (e.g., SPI Module 0 104, SPI Module 1 106 and/or SPI module N 108 of FIG. 1) for serial communication with a device external to the microcontroller via one or more input/output (I/O) pins, or to communicate with other peripherals of the microcontroller.

N-channel COM driver 110 may be configured, generally, for managing N-channel serial communication via grouped SPI modules 102. As a non-limiting example, N-channel COM driver 110 may be a communication driver configured to perform one or more functions of N-channel COM driver 110 described herein, and, more generally, to manage system 100, and components thereof, for N-channel serial communication. N-channel COM driver 110 may communicate with grouped SPI modules 102 via one or more data and control connections (e.g., buses and registers, without limitation) for sending and receiving N symbols 114, and interrupt TX/Rx INT.

As discussed herein, a number of SPI modules may be logically grouped (e.g., to form Grouped SPI modules 102, without limitation) by N-channel COM driver 110 to perform N-channel serial communication. In one or more embodiments, a number N of SPI modules used to form a group of SPI modules for N-channel communication will typically be at least two (stated another way, two or more). In some embodiments, an upper limit on a number N of SPI modules may be defined by a total number of external (i.e., external to system 100) connections available for serial communication (e.g., hardware pins available for I/O, without limitation). In some embodiments, an upper limit on a number N of SPI modules may be defined by a total number of available SPI modules (including without limitation modules configurable as SPI modules), e.g., the number of SPI modules included in a microcontroller, without limitation.

System 100, or a system including system 100, may include serial communication drivers (not depicted by FIG. 1, but depicted by FIG. 3) associated with one or more of the SPI modules and usable by N-channel COM driver 110 to manage performance of a serial communication as part of performing N-channel serial communication. Moreover, as discussed with reference to FIG. 3, while not being used to perform N-channel serial communication, one or more of the SPI modules may be operable to perform serial communication (e.g., managed by one of the serial communication drivers) independent from operation of other SPI modules, including independent of SPI modules of grouped SPI modules 102.

In one or more embodiments, for a given group of SPI modules, N-channel COM driver 110 may be configured to designate a managing SPI module and designate one or more managed SPI modules. In FIG. 1, SPI Module 0 104 is the designated managing SPI module and SPI Module 1 106 to SPI Module N 108 are the designated managed SPI modules, however, any of the available SPI modules used in grouped SPI modules 102 may be a managing SPI module and the others managed SPI module(s).

As discussed herein, N-channel COM driver 110 may be configured to manage (e.g., via the Selection control signal in FIG. 1, without limitation) provisioning of a serial clock of managing SPI module 104 to respective managed SPI modules 106 to 108 by clock source selection 116, and thereby synchronize transmission by SPI modules 104 to 108 of a group that are otherwise configured for asynchronous communication. By way of non-limiting example, synchronizing may include synchronizing the start of data transmission as well as transmission rates of respective SPI modules.

Clock source selection 116 may be configured to select among a number of clock sources and provide selected clocks 118 to clock inputs (e.g., clock 0 to clock N) of respective SPI modules of Grouped SPI Modules 102. In some embodiments, clock source selection may be a switching fabric configured to select, in response to a selection control signal ("Selection" received from N-channel COM driver 110 in FIG. 1), clocks from among a number of available clocks (e.g., a system or main clock and/or the serial clocks of the various SPI modules of grouped SPI Modules 102, without limitation). Clock source selection may be configured to provide selected clocks to each SPI module of grouped SPI Modules 102.

In the specific example depicted by FIG. 1, the available clock sources include serial clocks that may be output by the various SPI modules and include a main clock, which may be provided by system 100, or may be received by system 100. Since SPI Module 0 104 is designated a managing SPI, its serial clock, "N-Channel Serial Clock," is provided by clock source selection 116 to clock inputs 1 to N of SPI modules 1 106 to N 108, respectively. Main Clock (also sometimes characterized as a "system clock") is provided by clock source selection 116 to the clock input of managing SPI module, SPI module 0 104, namely, to input clock 0.

When SPI Module 0 104 sends symbols or bits on MOSI 0 (Master Output/Slave Input 0—i.e., the data output of a master in a serial communication), its serial clock (i.e., a clock output as a master serial communication clock) "N-Channel Serial Clock" is provided (e.g., routed by clock source selection 116, without limitation) to clock inputs of the managed SPI modules, here the inputs Clock 1 of SPI Module 1 106 to Clock N of SPI Module N 108.

SPI Module 1 106 to SPI Module N 108, in response to receiving the clock pulses of the N-Channel Serial Clock, are configured to send data on their respective data outputs, MOSI 1 to MOSI N, respectively.

In some embodiments, including the specific example depicted by FIG. 1, managed SPI modules may be configured (or configurable) to not send a serial clock during N-channel serial communication to slave SPI modules. In other embodiments, managed SPI modules may be configured (or configurable) to send a serial clock including the N-channel serial clock to respective slave SPI modules.

The clock sources received at inputs of respective managed SPI modules (e.g., Clock 1 of SPI Module 1 106 to Clock N of SPI Module N 108, without limitation) correspond to a clock provided at a serial clock output of SPI Module 0 104 (the managing SPI), namely, "N-Channel Serial Clock." Using a common clock source (or synchronized clock sources) synchronizes transmission for N-channel serial communication.

In some embodiments, a managing SPI module (e.g., SPI Module 0 104) may receive a clock source with a clock rate that is higher or equal to a desired clock rate for the N-channel serial clock, and may use the clock source as a reference clock for dividing or scaling (e.g., via a baud rate generator (not shown) or a digital divider more generally, without limitation) as needed to generate an N-channel serial clock, and provides the N-channel serial clock to a pin externally connected to a slave SPI module (not shown). As a non-limiting example, a managing SPI module may be configured to select a desired transmission rate and a clock source rate (e.g., as dictated by N-channel COM driver 110, without limitation), and to determine one or more input parameters for a clock divider (e.g., a ratio of the clock rate source to the desired transmission rate, a "divide by" value, and a modulus counter, without limitation). As non-limiting examples, a source clock may be referred to as the main or system clock, and may be an internally or externally (to system 100) generated clock source.

It should be appreciated that in some embodiments N-channel COM driver 110 may be configured to designate managing and managed SPI modules by managing the provision of a main clock to a clock input of a managing SPI module and provisioning of a serial clock of the managing SPI module to respective clock inputs of managed SPI modules.

By way of a contemplated operation of system 100, in response to a request to transmit N symbols stored in data memory 112, N-channel COM driver 110 designates SPI Module 0 104 as managing SPI by connecting (i.e., forming a signal path via clock source selection 116) the N-channel serial clock output of SPI Module 0 104 to respective clock inputs of SPI Module 1 106 to SPI Module N 108, i.e., Clock 1 to Clock N. N-channel COM driver 110 transfers, in parallel, individual symbols of N symbols 114 from data memory 112 to each of grouped SPI modules 102. Thus, when providing N symbols 114 to grouped SPI modules 102, an individual symbol of N symbols 114 is provided to each of SPI module 0 104, SPI module 1 106 . . . to SPI module N 108.

Notably, in cases where SPI modules 1 106 to SPI Module N 108 may be configured for automatic transmission, the automatic transmission by SPI module 1 106 to SPI module N 108 is disabled while the individual symbols of N symbols 114 are provided to these SPI modules. In one embodiment, transmission is disabled by not toggling a clock signal provided to a clock input of SPI module 1 106 to SPI module N 108 (e.g., holding a clock signal high or low at respective clock inputs of SPI module 1 106 to SPI module N 108, without limitation).

In some cases, it may be desirable (or just sufficient) to use a "rough" simultaneous transmission in a system configured for N-channel serial communication using enablement signaling to synchronize transmission by a group of SPI modules as discussed herein. Each SPI module may be individually enabled via an enablement signal (not shown), and once enabled transmit their respective symbols in response to: (i) a common clock or (ii) in response to a toggling of an enablement signal.

In another embodiment, an enablement signal (i.e., to enable transmission) is provided to inputs of SPI module 1 106 to SPI module N 108 by an enablement register (not shown), and de-asserted (e.g., the bits of the enablement register are set low, without limitation) to disable transmission and asserted (e.g., the bits of the enablement register are set high, without limitation) to enable transmission.

After providing symbols of N symbols 114 to SPI module 1 106 and SPI module N 108, N-channel COM driver 110 then provides the last remaining symbol of N symbols 114 to SPI module 0 104. As discussed herein, N-channel COM driver 110 provides the last remaining symbol of N symbols 114 to SPI module 0 104 because as soon as any data is provided to a managing SPI's data register the managing SPI will start transmitting the contents of its data register and pulse its serial clock (i.e., N-channel serial clock), which will trigger transmission by the managed SPIs. In another embodiment an enablement bit of an enablement register is provided to SPI module 0 104, and SPI module 0 104 is thus disabled from transmission until all symbols of N symbols 114 are loaded into respective SPI modules of grouped SPI modules 102, at which time the enablement bit may be toggled to enable transmission. In such an embodiment, the order of loading may not need to be constrained.

When SPI Module 0 104 transmits the contents of its data register (i.e., the bits of the symbol of N symbols 114) it also outputs a serial clock as N-channel serial clock used for serial communication with a receiver. As discussed herein, clock source selection 116 propagates the N-Channel Serial Clock to clock inputs of each of SPI Module 1 106 to SPI Module N 108 via clock source selection. The clock pulses of N-Channel Serial Clock trigger SPI Module 1 106 to SPI Module N 108 to send their respective symbols of N symbols 114 in a serial communication transaction (e.g., serially transmit the contents of their respective data registers (i.e., the respective symbol of N symbols 114) to interconnect 120, without limitation).

N-channel COM driver 110 is informed by interrupt Tx/Rx INT that grouped SPI modules 102 finished sending the N symbols 114 (e.g., finished transmitting the contents of their respective data registers, including N symbols 114, to interconnect 120, without limitation). In some embodiments, N-channel COM driver 110 is informed that Grouped SPI Modules 102 finished sending the N symbols 114 via Tx/Rx INT when a symbol is sent or when a number of clock cycles corresponding to a symbol have passed (e.g., a counter (not shown) may count serial clock cycles up to a symbol size and trigger Tx/Rx INT when count equals symbol size, without limitation).

In some embodiments of an N-channel serial communication arrangement using grouped SPI modules 102, a receiver (slave) will send return data to a sender in response to transmit data sent to it. So, in the operation of system 100 contemplated above on the same clock cycle that a bit of transmit data is sent, respective SPI modules of grouped SPI modules 102 receive a bit of return data. In various embodiments, different shift registers of each SPI module may be used to store bits of transmit symbols and bits of return symbols, or the same shift register of an SPI module may be used to store bits of transmit symbols and bits of return symbols (e.g., transmit shift register 212 of FIG. 2, without limitation).

N-channel COM driver 110 is shown and described as receiving and/or providing transmit symbols to SPI modules, but that is not necessarily the case. In some embodiments, various control elements for moving bits of symbols to and from data memory 112 are invoked by N-channel COM driver 110. As a non-limiting example, in a microcontroller implementation where peripherals are configured as SPI modules, one or memory controllers may cause symbols to be moved from data memory 112 to peripherals configured as SPI modules, such as SPI module 0 104, SPI module 1 106 and SPI module N 108 via a data bus, including without limitation a peripheral bus.

In some cases, grouping a number of SPI modules such as grouped SPI modules 102 may be understood to create a temporary hardware interface. A specific configuration for grouped SPI modules 102 (e.g., number, transmission rate, without limitation) may be selected to provide a specific hardware interface. Non-limiting examples of specific hardware interfaces include a dual-SPI hardware interface and a quad-SPI hardware interface.

Figure 2:
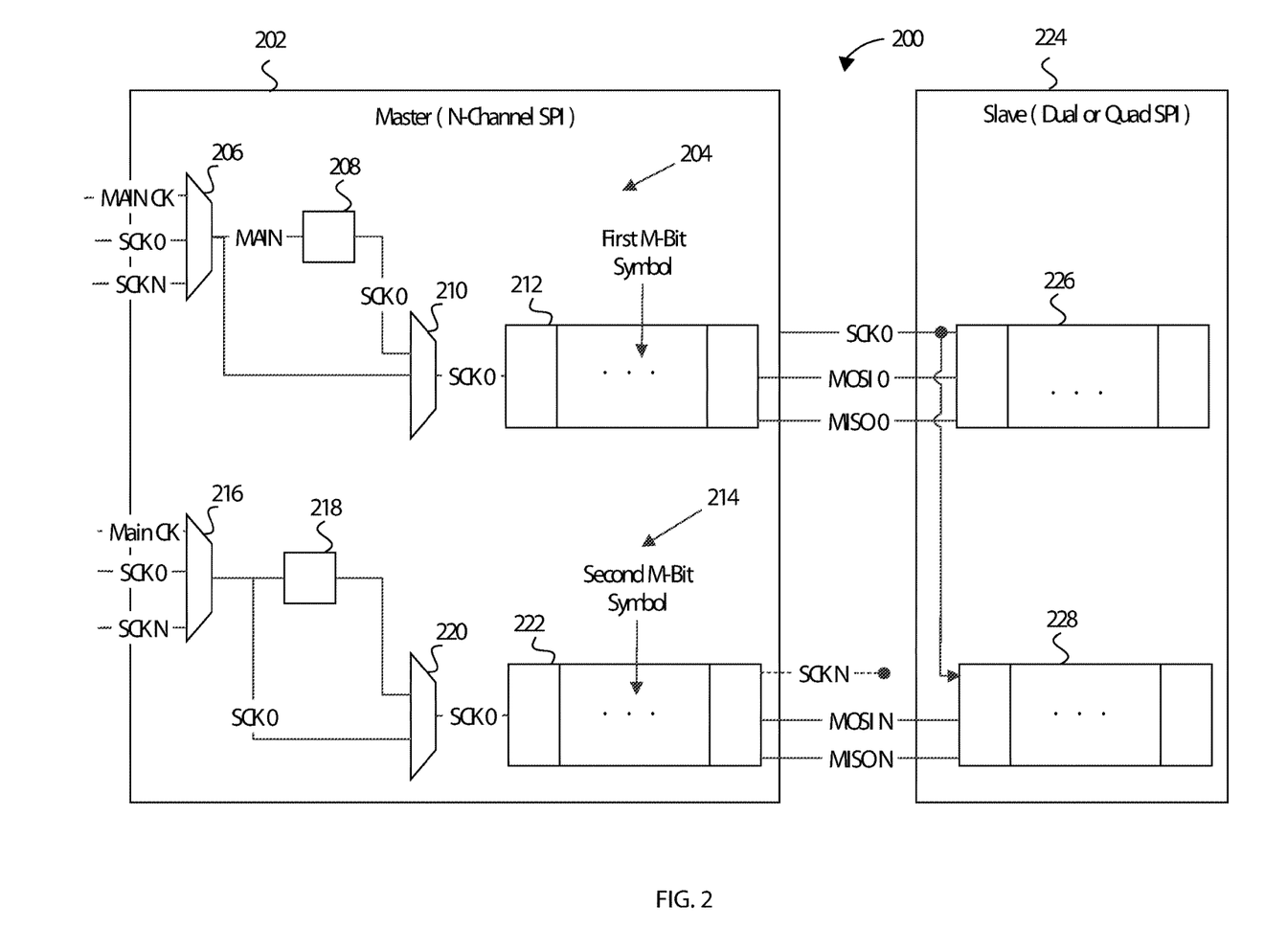
FIG. 2 illustrates a communication system including a master N-channel serial peripheral interface module in data communication with a slave serial peripheral interface module, in accordance with one or more embodiments.

FIG. 2 shows a block diagram of a communication system 200 that includes a master N-channel SPI 202 (also referred to as "master 202") in data communication with a slave (quad or dual SPI) 224 (also referred to as "slave 224"), in accordance with one or more embodiments.

Master 202 includes a number N of grouped SPI modules, here, SPI module 0 204 to SPI module N 214. Each SPI module of master 202 includes respective clock source selections (e.g., source selections 206/216), baud rate generators (e.g., baud rate generators 208/218), bypasses (e.g., bypasses 210/220), and transmit shift registers (e.g., transmit shift registers 212/222).

In the specific example depicted by FIG. 2, SPI module 0 204 is a managing SPI of master 202 and the remaining SPI modules (represented by SPI module N 214) are a managed SPI of master 202. Each of SPI module 0 204 to SPI module N 214 is configured to receive clocks at respective inputs of clock source selection 206 to 216. In the specific example depicted by FIG. 2, available clock sources include MAIN clock, and serial clock 0 of SPI module 0 204 (SCK 0) to serial clock N of SPI module N 214 (SCK N). For ease of illustration, serial clocks 0 to N are all depicted as inputs to clock source selection 206, but that is not necessarily the case. In some cases, an SPI module of a master 202 such as SPI module 204 may use a clock generated by baud rate generator 208 for a serial clock (SCK 0) of a given clock transmission. As a non-limiting example, a baud rate generator (such as baud rate generators 208 to 218, without limitation) may be configured to generate a clock by dividing or lengthening pulses of a reference clock (e.g., MAIN CK) to achieve a desired clock rate.

Managed SPI module(s) N 214 may include a baud rate generator 218, and during a contemplated N-channel communication the baud rate generator 218 may be disabled or bypassed in favor of another clock source. In the specific example depicted by FIG. 2, a clock (not shown) generated by baud rate generator 218 is ignored in favor of SCK 0 provided by clock source selection 216 using bypass 220 responsive to a selection signal provided by N-channel COM driver 110 of FIG. 1. In another embodiment, baud rate generator 218 may be configured to be enabled/disabled in response to an enablement signal (not shown), and so disabled when SPI module N 214 is configured as a managed SPI. Master 202 may include a clock path configured to carry a serial clock of SPI module 204, i.e., SCK 0, to an input of clock source selection 216 of managed SPI module N 214. In some embodiments, a clock rate of a clock generated by baud rate generator 208 may be configured by communication logic for dual or quad SPI communication, e.g., by N-channel COM driver 110 (configuration signal not shown).

Respective transmit shift registers 212 to 222 of SPI module 0 204 to SPI module N 214 may be configured to receive (e.g., from N-channel COM driver 110 of FIG. 1, without limitation) and store m-bit symbols. Transmit shift registers 212 to 222 may be further configured to serially transmit respective m-bit symbols to slave 224 via respective master output/slave input lines MOSI 0 to MOSI N in response to clock SCK 0 received at transmit shift registers 212 to 222.

In a contemplated operation of communication system 200, m-bit symbols 0 to N are received and stored at transmit shift registers 212 to 222 on a first clock cycle of serial clock SCK 0. Upon receiving m-bit symbols 0 to N, on an immediately subsequent clock cycle, transmit shift registers 212 to 222 start serially transmitting out their contents during m successive clock cycles of SCK 0. More specifically, transmit shift registers 212 to 222 shift their contents, one bit at a time, onto MOSI 0 to MOSI N, respectively. SPI module N 214 transmits SCK 0 via a serial clock line (such line also denoted SCK 0 by FIG. 2). Shift registers 226 to 228 of slave 224 receive and store the bits of the m-bit symbol transmitted by SPI module 204 to 216 on successive clock cycle of SCK 0. As depicted by FIG. 2, in some embodiments, serial clock line denoted SCK 0 is connected to each of the shift registers 226 to 228 of slave 224.

In a contemplated dual-SPI configuration of slave 224, slave 224 includes two serial data inputs operatively coupled to MOSI 0 and MOSI N (in this example N=2). Though depicted in FIG. 2, it is not necessarily the case that slave 224 includes two individual shift registers 226 and 228. Instead, slave 224 may operate in a "dual SPI" mode, an individual input data pin and an individual output data pin of slave 224 may be used as serial inputs of slave 224 to receive two bits of an m-bit symbol per clock cycle—e.g., one bit per clock cycle on the input data pin and one bit per clock cycle on the output data pin. As a non-limiting example, the MOSI line becomes a first serial line and carries even bits, and the MISO line becomes a second serial line and carries odd bits.

In a contemplated quad SPI configuration of slave 224, slave 224 may include four serial data inputs (depicted but not denoted in FIG. 2) operatively coupled to MOSI 0 to N (in this example N=3) of master 202, and which collectively receive four bits of an m-bit symbol per clock cycle of SCK 0.

As discussed herein, in some embodiments, master 202 may receive return data from slave 224 in a same or different data transaction where master 202 sends the m-bit symbol. While the master outputs MOSI 0 to N and master inputs MISO 0 to N are depicted as both connected to a most-significant bit position of transmit shift registers 212 to 222, MOSI 0 to N and MISO 0 to N may be connected to transmit shift registers 212 to 222 such that transmit bits may be sent from a most-significant bit position while receive bits are received at a least-significant bit position, or vice versa.

Figure 3:
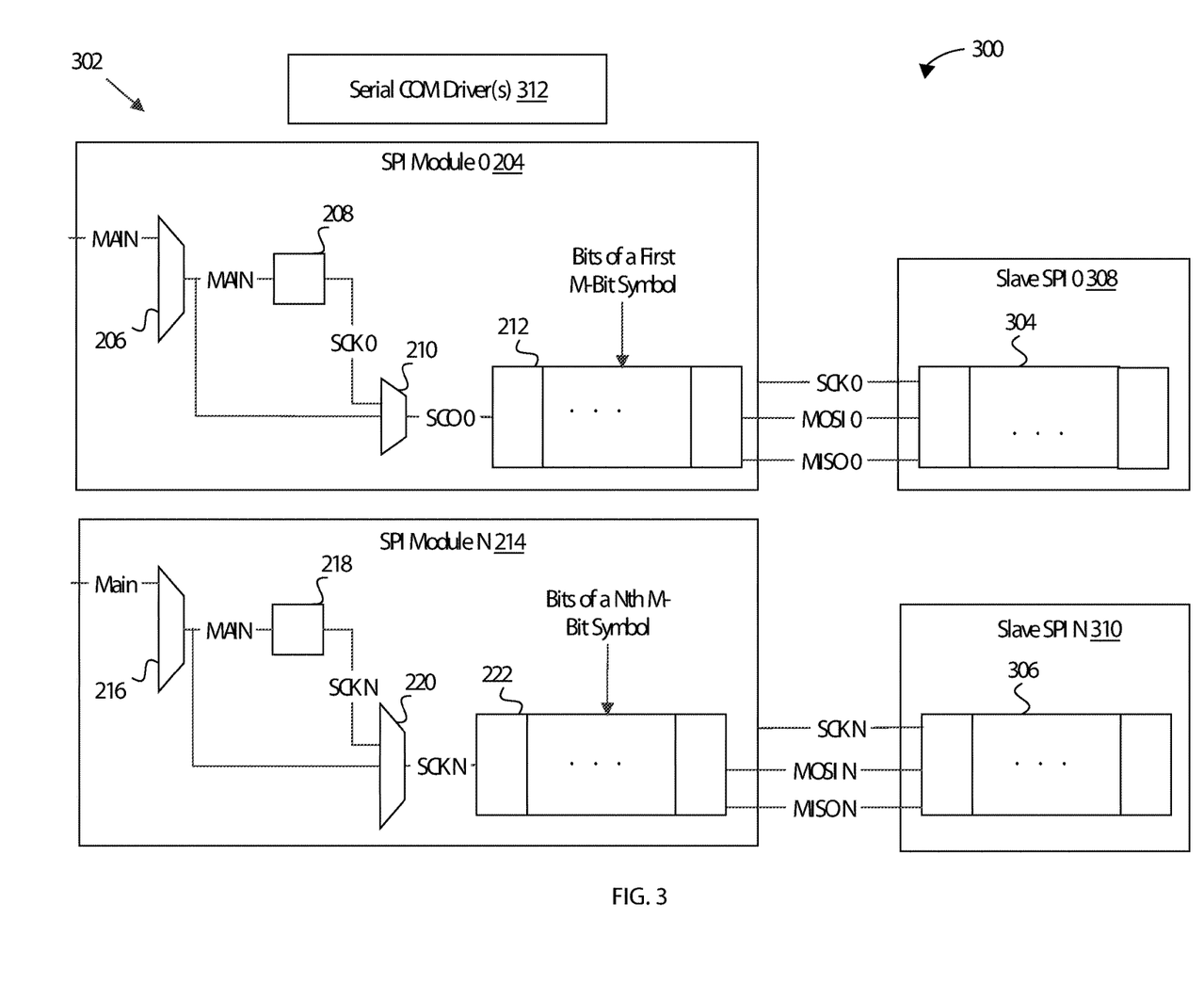
FIG. 3 illustrates a system that includes a number of groupable SPI modules that are ungrouped and individually form communication systems with individual slave SPI modules, in accordance with one or more embodiments.

FIG. 3 is a block diagram of a system 300 that includes a number of groupable SPI modules that are ungrouped and individually form communication systems with slave SPI modules, in accordance with one or more embodiments. In particular, FIG. 3 depicts ungrouped SPI modules 302 including SPI module 0 204 to SPI module N 214. As discussed herein, in some cases otherwise groupable SPI modules may operate in an ungrouped fashion until or after being grouped for an N channel communication. In an ungrouped configuration, clock source selections 206 to 216 are configured to provide a main clock to each of baud rate generators 208 to 218. Moreover, bypasses 210 to 220 are configured to propagate the outputs of the baud rate generators 208 to 218 to the respective clock inputs of transmit shift registers 212 to 222.

A serial COM driver(s) 312 may manage serial communication by SPI module 0 204 to SPI module N 214.

By way a contemplated operation of ungrouped SPI modules 302 where SPI module 0 212 to SPI module N 222 are in data communication with slave SPI 0 308 to slave SPI 0 N 310. Clock source selections 206 to 216 provide a main clock (for the sake of simplicity other clock sources are not depicted by FIG. 3) to baud rate generators 208 to 218. Baud rate generators 208 to 216 generate clocks SCK 0 to SCK N in response to main clock, and to provide generated clocks SCK 0 to SCK N to transmit shift registers 212 to 222 via bypasses 210 to 220 (neither of which operate in a bypass mode). Upon receipt of respective m-bit symbols, transmit shift registers 212 to 222 shift their contents to data outputs MOSI 0 to MOSI N respectively. Moreover, SPI module 0 212 to SPI module N 222 provide respective serial clocks SCK 0 and SCK N to serial clock outputs (also denoted as SCK 0 and SCK N in FIG. 3). M-bit symbols are received and stored at transmit shift registers 304 to 306 of slave 308 to 310, respectively.

Figure 4:
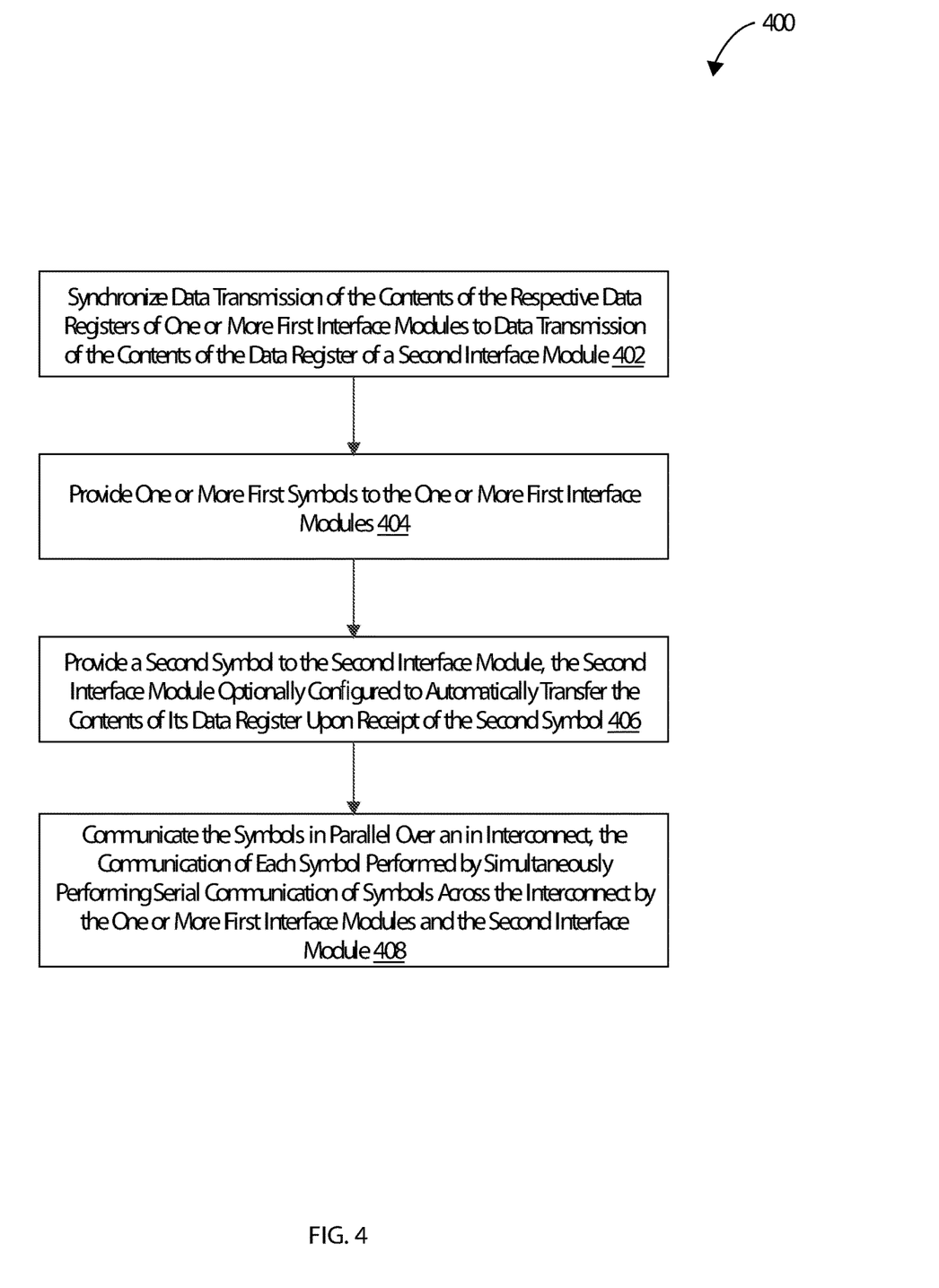
FIG. 4 illustrates a process for performing an N-channel communication of a symbol using an interface configured as N-channel SPI in accordance with one or more embodiments.

FIG. 4 shows a flowchart of a process 400 for performing an N-channel communication of a number of symbols using an N-channel SPI module, such as the N-channel SPI modules of system 100, without limitation, and in accordance with one or more embodiments.

In operation 402, process 400 synchronizes data transmission of the contents of the respective data registers of one or more first interface modules to data transmission of the contents of the data register of a second interface module, the one or more first interface modules and the second interface module being configured as SPI modules. In some embodiments, process 400 may synchronize data transmission by designating the one or more first interface modules as managed SPI modules and designating the second interface module as a managing SPI module, and using a serial clock of the managing SPI to control data transmission by the managed SPIs, as discussed herein.

As discussed above, in some embodiments, process 400 may synchronize transmission via an enablement signal provided to the first interface modules and the second interface module, and then toggle the enablement signal to cause the interface modules to transmit the contents of their data registers.

In operation 404, process 400 provides one or more first symbols to the one or more first interface modules, respectively. In operation 406, process 400 provides a second symbol to the second interface module.

Optionally, the second interface module may be configured to automatically transfer the contents of its data register upon receipt of the provided second symbol. In embodiments where process 400 synchronizes transmission by the one or more first interface modules to the second interface module by toggling an enablement signal, operation 404 and operation 406 may be performed in any order. However, in embodiments where process 400 uses a serial clock of the second interface module to synchronize transmission of the one or more first interface modules to the second interface module, process 400 performs operation 404 prior to performing operation 406.

In operation 408, process 400 performs parallel communication of the first symbols and the second symbol across an interconnect by simultaneously performing serial communication of the respective first and second symbols using the one or more first interface modules and the second interface module. Thus, bits of each of the first symbols are transmitted serially and simultaneously with each other and with transmission of bits of the second symbol. The interconnect may include a number of interconnects, and respective interface modules may use some of the interconnects for serial communication.

Figure 5:
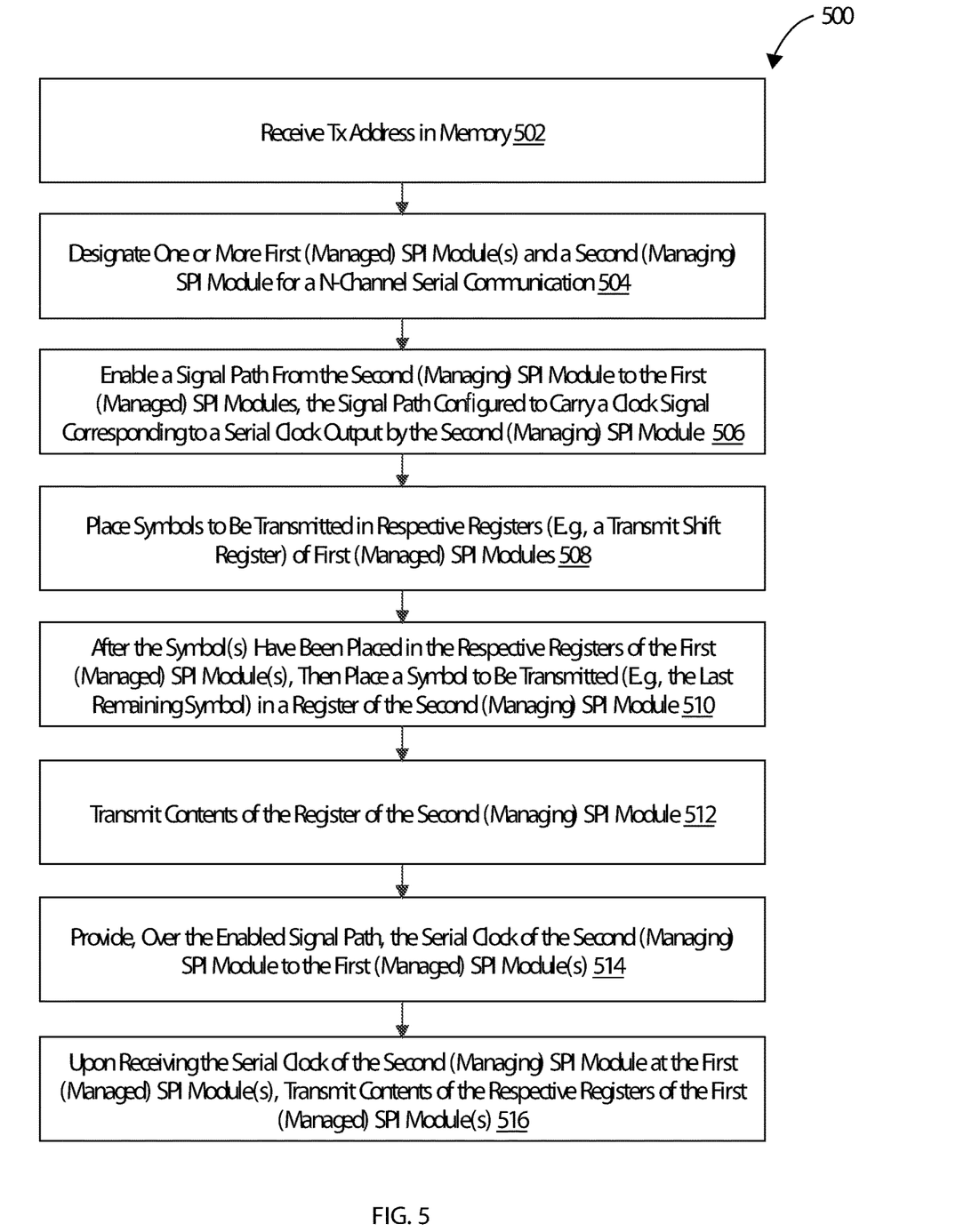
FIG. 5 illustrates a process for sending N symbols over N channels, in accordance with one or more embodiments.

FIG. 5 shows a flow chart of a process 500 for performing an N-channel serial communication of symbols using an interface module configured as an N-channel SPI module (e.g., system 100 of FIG. 1, without limitation), in accordance with one or more embodiments.

In operation 502, process 500 receives a signal informing process 500 of a transmit address corresponding to an address in a memory storing N symbols for N-channel serial communication.

In operation 504, process 500 designates two or more managed SPI modules, also referred to herein as first SPI modules, and designates a managing SPI module, also referred to herein as a second SPI module, for an N-channel serial communication.

In operation 506, process 500 enables/defines a signal path from the managing SPI module to the managed SPI modules. The signal path may be configured to carry a clock signal corresponding to a serial clock output by the managing SPI module to respective inputs (i.e., clock inputs) of the managed SPI modules. In some embodiments, a signal path may be defined by configuring a path for the serial clock output by the managing SPI module to be used as the clock source for the managed SPI modules. In one embodiment, a path may be configured by configuring a managed SPI module to use a specified clock by designating the clock in a managed SPI module's control register (not shown). In one embodiment, such a control register may provide the selection signal used for clock source selection. In another embodiment, SPI modules of grouped SPI modules may each include clock source selection circuitry.

In operation 508, process 500 places symbols to be transmitted into registers of the managed SPI modules, i.e., the first SPI modules.

After placing all of the symbols to be transmitted into the data registers of the managed SPI module(s), then in operation 510, process 500 places a symbol to be transmitted into the register of the managing SPI module. In one embodiment, the symbol placed in the register of the managing SPI module in operation 510 is the last remaining symbol of the stored N symbols to be transmitted.

In operation 512, process 500 automatically transmits the contents of the register of the managing SPI module in response to the placing of the last remaining symbol of the stored N symbols in the register of the managing SPI module in operation 510. In one embodiment, transmitting the contents of the register of the managing SPI module includes performing a serial transmission of the bits of the last remaining symbol.

In operation 514, process 500 shares the serial clock output of the managing SPI module with the managed SPI modules over the signal path enabled in operation 506. The serial clock output of the managing SPI module is denoted the N-channel serial clock in FIG. 1.

In operation 516, process 500 transmits the contents of the registers of the managed SPI modules upon receiving the serial clock output of the managing SPI module provided in operation 514 at the managed SPI modules. In one embodiment, transmitting the contents of a register of a managed SPI module includes performing a serial transmission of the bits of the symbol stored in its register.

Notably, the contents of the register of the managing SPI module transmitted in operation 512 and the contents of the registers of the managed SPI modules transmitted in operation 516 are transmitted simultaneously, such respective transmissions synchronized by the N-channel serial clock.

Figure 6:
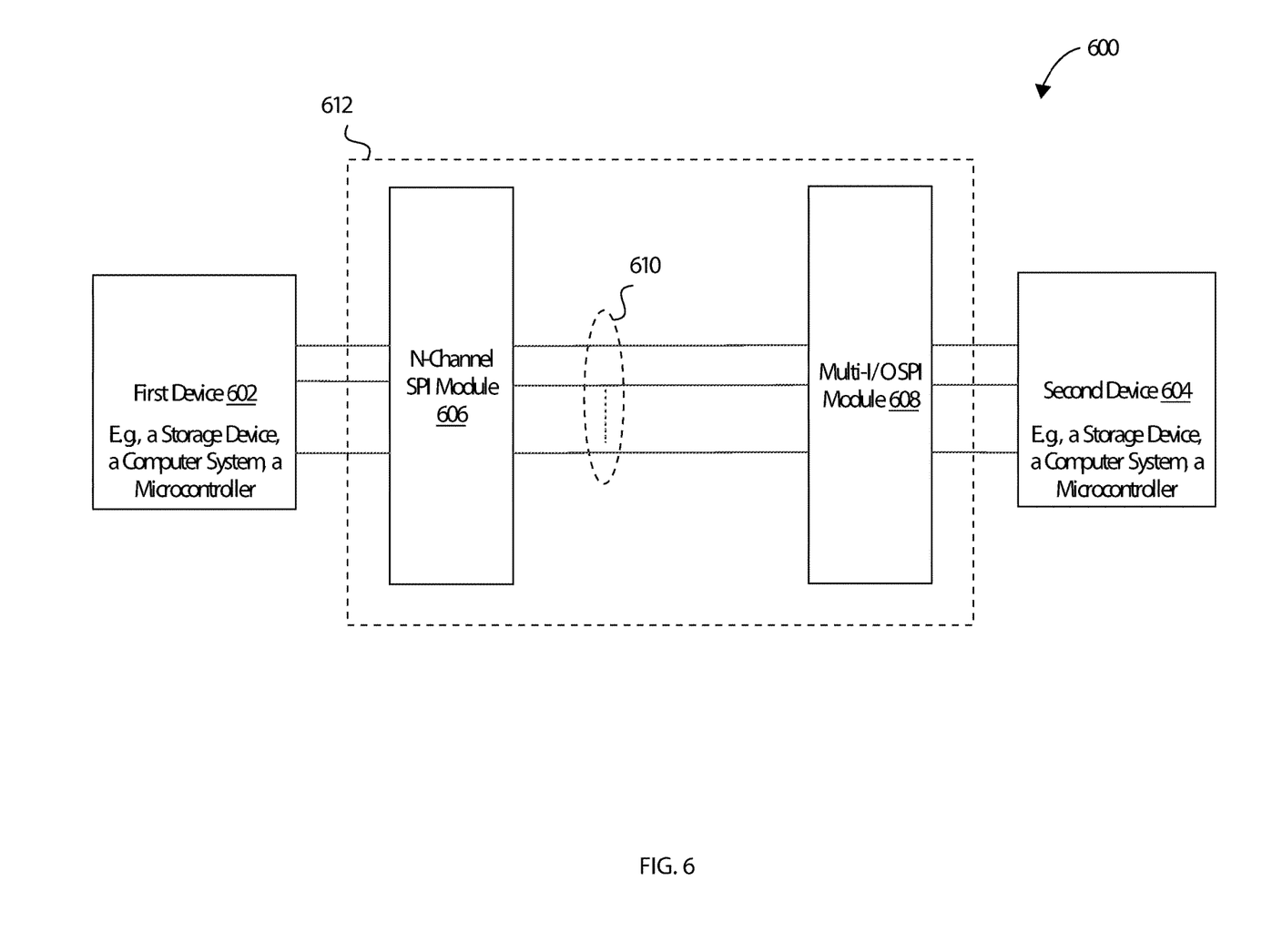
FIG. 6 illustrates a system including an N-channel serial communication link in accordance with one or more embodiments.

FIG. 6 depicts a block diagram of a system 600 including first device 602 and second device 604 in communication over an N-channel serial communication link 612 in accordance with one or more embodiments. In the embodiment depicted by FIG. 6, first device 602 and second device 604 are linked by N-channel serial communication link 612 or by a communication link including N-channel serial communication link 612. In some embodiments, first device 602 and/or second device 604, by way of non-limiting example, may be configured as one or more of a Flash memory (e.g., NAND Flash and NOR Flash, without limitation), a random-access memory, an electrically erasable programmable memory (EEPROM), read only memory (ROM), resistive random-access memory (RERAM), and a hard disc. In one or more embodiments, one or more buses may be configured as N-channel serial communication link 612 for operable coupling of devices, including without limitation first device 602 and second device 604 of system 600.

N-channel serial communication link 612 may include a number of serial communication channels for conveying symbols and bits, here N serial communication channels 610, that may be used by system 600, individually, for serial communication, and used by system 600 in groups of two or more channels for N-channel serial communication, where N is greater than or equal to two. N-channel serial communication link 612 includes N-channel SPI module 606 and multi I/O SPI module 608, which are arranged to facilitate N-channel serial communication at system 600. As non-limiting examples, the N-channel SPI module 606 may be configured as a system 100 or master 202. As non-limiting examples, multi I/O SPI module 608 may be a dual SPI module, a quad SPI module, or an N-channel SPI module (in accordance with disclosed embodiments). As a non-limiting example, N serial communication channels 610 may be or include one or more of physical links (e.g., wired and/or wireless transmission paths, without limitation) and logical links that use physical links.

A communication bus configured as an N-channel serial communication link 612 may send and/or receive synchronous data on up to N channels, where N corresponds to a number of serial communication channels available at N-channel serial communication link 612. As a non-limiting example, an 8-bit microcontroller implementing N-channel SPI module 606 may be configured for quad and/or dual SPI communication with a serial static random-access memory device that includes a multi I/O SPI module 608 that supports quad SPI, dual SPI, or N-channel SPI.

Figure 7:
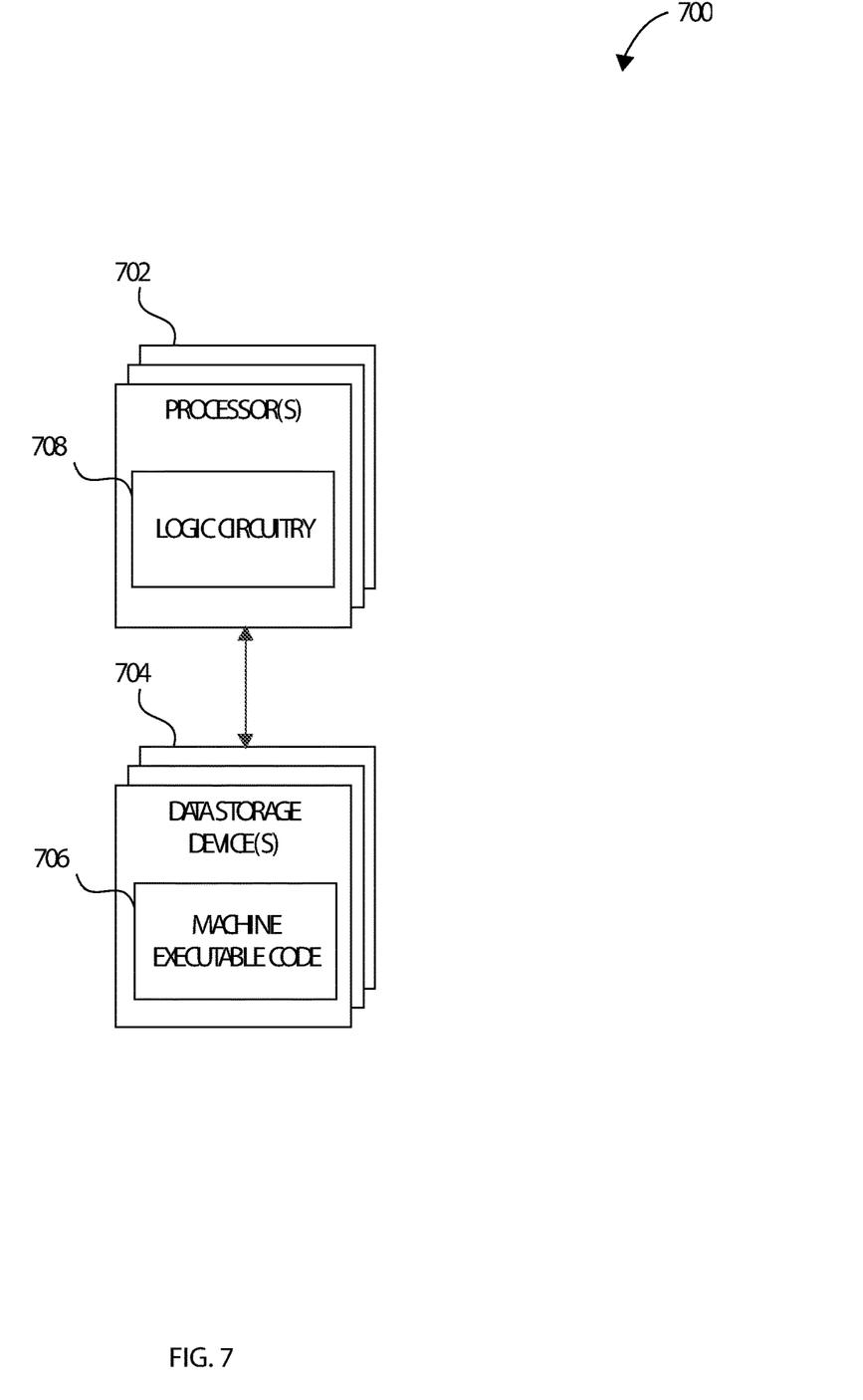
FIG. 7 illustrates a block diagram of circuitry that may be used to implement various functions, operations, acts, processes, and/or methods, in accordance with one or more embodiments.

FIG. 7 is a block diagram of circuitry 700 that, in some embodiments, may be used to implement various functions, operations, acts, processes, and/or methods disclosed herein. The circuitry 700 includes one or more processors 702 (sometimes referred to herein as "processors 702") operably coupled to one or more apparatuses such as data storage devices (sometimes referred to herein as "storage 704"), without limitation. The storage 704 includes machine executable code 706 stored thereon (e.g., stored on a computer-readable memory) and the processors 702 include logic circuitry 708. The machine executable code 706 include information describing functional elements that may be implemented by (e.g., performed by) the logic circuitry 708. The logic circuitry 708 is adapted to implement (e.g., perform) the functional elements described by the machine executable code 706. The circuitry 700, when executing the functional elements described by the machine executable code 706, should be considered as special purpose hardware configured for carrying out functional elements disclosed herein. In some embodiments the processors 702 may be configured to perform the functional elements described by the machine executable code 706 sequentially, concurrently (e.g., on one or more different hardware platforms), or in one or more parallel process streams.

When implemented by logic circuitry 708 of the processors 702, the machine executable code 706 is configured to adapt the processors 702 to perform operations of embodiments disclosed herein. For example, the machine executable code 706 may be configured to adapt the processors 702 to perform at least a portion or a totality of the process 400 of FIG. 4 and process 500 of FIG. 5. As another example, the machine executable code 706 may be configured to adapt the processors 702 to perform at least a portion or a totality of the operations discussed for system 100 of FIG. 1, and more specifically, one or more of the SPI modules of FIG. 1 (e.g., SPI module 0 104 to SPI module N 108, without limitation), N-channel COM driver 110 of FIG. 1, and clock source selection 116 of FIG. 1. As another example, the machine executable code 706 may be configured to adapt the processors 702 to perform at least a portion or totality of the operations discussed for systems 200 and 300 of FIGS. 2 and 3, and more specifically, one or more of master 202, slave 224, clock source selections 206 to 216, baud rate generators 208 to 218, bypasses 210 to 220, and transmit shift registers 212 to 222.

As a specific, non-limiting example, the computer-readable instructions may be configured to instruct the processors 702 to perform at least some functions of an N-channel communication interface and/or to perform N-channel serial communication more generally, as discussed herein.

The processors 702 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute computing instructions (e.g., software code) related to embodiments of the present disclosure. It is noted that a general-purpose processor (may also be referred to herein as a host processor or simply a host) may be a microprocessor, but in the alternative, the processors 702 may include any conventional processor, controller, microcontroller, or state machine. The processors 702 may also be implemented as a combination of computing devices, such as a combination of a DSP and a microprocessor, a plurality of microprocessors, one or more microprocessors in conjunction with a DSP core, or any other such configuration.

In some embodiments the storage 704 includes volatile data storage (e.g., random-access memory (RAM)), non-volatile data storage (e.g., Flash memory, a hard disc drive, a solid state drive, erasable programmable read-only memory (EPROM), etc.). In some embodiments the processors 702 and the storage 704 may be implemented into a single device (e.g., a semiconductor device product, a system on chip (SOC), etc.). In some embodiments the processors 702 and the storage 704 may be implemented into separate devices.

In some embodiments the machine executable code 706 may include computer-readable instructions (e.g., software code, firmware code). By way of non-limiting example, the computer-readable instructions may be stored by the storage 704, accessed directly by the processors 702, and executed by the processors 702 using at least the logic circuitry 708. Also by way of non-limiting example, the computer-readable instructions may be stored on the storage 704, transmitted to a memory device (not shown) for execution, and executed by the processors 702 using at least the logic circuitry 708. Accordingly, in some embodiments the logic circuitry 708 includes electrically configurable logic circuitry 708.

In some embodiments the machine executable code 706 may describe hardware (e.g., circuitry) to be implemented in the logic circuitry 708 to perform the functional elements. This hardware may be described at any of a variety of levels of abstraction, from low-level transistor layouts to high-level description languages. At a high-level of abstraction, a hardware description language (HDL) such as an Institute of Electrical and Electronics Engineers (IEEE) Standard hardware description language (HDL) may be used, without limitation. By way of non-limiting examples, Verilog™ SystemVerilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 708 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments the machine executable code 706 may include an HDL, an RTL, a GL description, a mask level description, other hardware description, or any combination thereof.

In embodiments where the machine executable code 706 includes a hardware description (at any level of abstraction), a system (not shown, but including the storage 704) may be configured to implement the hardware description described by the machine executable code 706. By way of non-limiting example, the processors 702 may include a programmable logic device (e.g., an FPGA or a PLC) and the logic circuitry 708 may be electrically controlled to implement circuitry corresponding to the hardware description into the logic circuitry 708. Also by way of non-limiting example, the logic circuitry 708 may include hard-wired logic manufactured by a manufacturing system (not shown, but including the storage 704) according to the hardware description of the machine executable code 706.

Regardless of whether the machine executable code 706 includes computer-readable instructions or a hardware description, the logic circuitry 708 is adapted to perform the functional elements described by the machine executable code 706 when implementing the functional elements of the machine executable code 706. It is noted that although a hardware description may not directly describe functional elements, a hardware description indirectly describes functional elements that the hardware elements described by the hardware description are capable of performing.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting embodiments of the disclosure may include:

Embodiment 1: An N-channel serial peripheral interface (SPI) module for N-channel serial communication, the N-channel SPI module comprising: a number N of serial peripheral interface (SPI) modules; and a communication driver for performing an N-channel communication of N symbols using the N SPI modules, the communication driver configured to: synchronize data transmission by one or more first SPI modules to data transmission by a second SPI module of the N SPI modules; provide one or more first symbols to the one or more first SPI modules; and provide a second symbol to the second SPI module.

Embodiment 2: The N-channel SPI module according to Embodiment 1, wherein the second SPI module is configured to transmit contents of a register of the second SPI module upon receipt of the second symbol.

Embodiment 3: The N-channel SPI module according to any of Embodiment 1 and 2, wherein the one or more first SPI modules are configured to transmit contents of respective registers of the first SPI modules in response to a data transmission by the second SPI module.

Embodiment 4: The N-channel SPI module according to any of Embodiment 1 to 3, further comprising a clock source selection circuitry configured to receive available clocks and provide clocks selected from the available clocks responsive to a selection control signal.

Embodiment 5: The N-channel SPI module according to any of Embodiment 1 to 4, wherein the available clocks comprise a main clock and a serial clock of the second SPI module.

Embodiment 6: The N-channel SPI module according to any of Embodiment 1 to 5, wherein the selection control signal indicates a clock for the one or more first SPI modules and indicates a clock for the second SPI module.

Embodiment 7: The N-channel SPI module according to any of Embodiment 1 to 6, wherein the communication driver is configured to synchronize the data transmission by the one or more first SPI modules of the N SPI modules to data transmission by the second SPI module of the N SPI modules by, at least in part, a clock source selection circuitry arranged to enable a signal path for carrying a serial clock from the second SPI module to a clock input of each of the one or more first SPI modules.

Embodiment 8: The N-channel SPI module according to any of Embodiment 1 to 7, wherein respective N SPI modules of the N SPI modules each comprise a transmit shift register and are configured to perform a transmission by shifting contents of their respective transmit shift register to an interconnect operably coupled to the transmit shift register.

Embodiment 9: A method of performing an N-channel serial communication of N symbols, the method comprising: synchronizing data transmission by one or more first SPI modules to data transmission by a second SPI module; providing one or more first symbols to respective ones of the first SPI modules; providing a second symbol to the second SPI module; and performing a parallel communication of the one or more first symbols and the second symbol across an interconnect using the one or more first SPI modules and the second SPI module.

Embodiment 10: The method according to Embodiment 9, wherein the synchronizing the data transmission by the one or more first SPI modules to data transmission by the second SPI module comprises providing a serial clock from the second SPI module to the one or more first SPI modules.

Embodiment 11: The method according to any of Embodiment 9 and 10, wherein the performing the parallel communication of the first symbols and the second symbol comprises: simultaneously communicating the one or more first symbols and the second symbol.

Embodiment 12: The method according to any of Embodiment 9 to 11, wherein the simultaneously communicating the one or more first symbols and the second symbol comprises: transmitting contents of respective registers of the one or more first SPI modules, and transmitting contents of a register of the second SPI module.

Embodiment 13: The method according to any of Embodiment 9 to 12, wherein the simultaneously communicating the one or more first symbols and the second symbol comprises: performing serial communication of the one or more first symbols and the second symbol.

Embodiment 14: A system, comprising: an N-channel serial peripheral interface (SPI) module; a multi-input/output (I/O) SPI module; and at least N serial communication channels for conveying symbols between the N-channel SPI module and the multi-I/O SPI module; and wherein the N-channel SPI module is configured to simultaneously transmit symbols over the at least N serial communication channels.

Embodiment 15: The system according to Embodiment 14, further comprising: an N-channel serial communication link, the N-channel serial communication link comprising: the N-channel SPI module, the multi-I/O SPI module, and the N serial communication channels.

Embodiment 16: The system according to any of Embodiment 14 and 15, further comprising: a first device and a second device, and wherein the first device and the second device are operably coupled by the N-channel serial communication link.

Embodiment 17: The system according to any of Embodiment 14 to 16, wherein one or more of the first device and the second device comprises one of a microcontroller, a computer system, and a storage device.

Embodiment 18: An apparatus comprising a storage having machine executable code stored thereon, the machine executable code adapted for configuring a logic circuit such that the logic circuit may perform an N-channel serial communication of symbols, the N-channel serial communication of the symbols comprising: synchronizing data transmission by one or more first interface modules to data transmission by a second interface module; providing one or more first symbols to the one or more first interface modules; providing a second symbol to the second interface module; and performing a parallel communication of the first symbols and the second symbol across an interconnect using the one or more first interface modules and the second interface module.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. An apparatus comprising:
a number N of serial peripheral interface (SPI) modules;
a communication driver for performing an N-channel communication of N symbols using the N SPI modules, the communication driver to:
set data transmission by one or more first SPI modules to be responsive to a serial clock of a second SPI module of the N SPI modules to synchronize data transmission by the one or more first SPI modules to data transmission by the second SPI module of the N SPI modules;
provide one or more first symbols of the N symbols to the one or more first SPI modules; and
provide a second symbol of the N symbols to the second SPI module; and
a clock source selection circuitry arranged to selectively enable respective signal paths for carrying the serial clock from the second SPI module to a clock input of each of the one or more first SPI modules,
wherein N is an integer greater than 1.

2. The apparatus of claim 1, wherein the second SPI module comprises a register to transmit contents of the register upon receipt of the second symbol.

3. The apparatus of claim 1, wherein the one or more first SPI modules comprise registers to transmit contents of respective registers in response to a data transmission by the second SPI module.

4. The apparatus of claim 1, wherein the clock source selection circuitry is to receive available clocks and provide clocks selected from the available clocks responsive to a selection control signal.

5. The apparatus of claim 4, wherein the available clocks comprise a main clock and a serial clock of the second SPI module.

6. The apparatus of claim 4, wherein the selection control signal indicates a clock for the one or more first SPI modules and indicates a clock for the second SPI module.

7. The apparatus of claim 1, wherein respective N SPI modules of the N SPI modules each comprise a transmit shift register and are to perform a transmission by shifting contents of their respective transmit shift register to an interconnect operably coupled to the transmit shift register.

8. A method comprising:
setting data transmission by one or more first SPI modules of a number N of SPI modules responsive to a serial clock of a second SPI module of the N SPI modules to synchronize data transmission by the one or more first SPI modules to data transmission by the second SPI module;
enabling respective signal paths for carrying the serial clock from the second SPI module to a clock input of each of the one or more first SPI modules;
providing one or more first symbols to respective ones of the first SPI modules;
providing a second symbol to the second SPI module; and
performing a parallel communication of the one or more first symbols and the second symbol across an interconnect using the one or more first SPI modules and the second SPI module,
wherein N is an integer greater than 1.

9. The method of claim 8, wherein the performing the parallel communication of the first symbols and the second symbol comprises: simultaneously communicating the one or more first symbols and the second symbol.

10. The method of claim 9, wherein the simultaneously communicating the one or more first symbols and the second symbol comprises: transmitting contents of respective registers of the one or more first SPI modules, and transmitting contents of a register of the second SPI module.

11. The method of claim 9, wherein the simultaneously communicating the one or more first symbols and the second symbol comprises: performing serial communication of the one or more first symbols and the second symbol.

12. A system, comprising:
an N-channel serial peripheral interface (SPI) module, comprising:
a number N of SPI modules; and
a clock source selection circuitry arranged to selectively enable respective signal paths for carrying a serial clock from a first SPI module of the N SPI modules to a clock input of each of one or more second SPI modules of the N SPI modules;
a multi-input/output (I/O) SPI module;
at least N serial communication channels for conveying symbols between the N-channel SPI module and the multi-I/O SPI module;
an N-channel serial communication link, the N-channel serial communication link comprising:
the N-channel SPI module, the multi-I/O SPI module, and the N serial communication channels; and
wherein the N-channel SPI module is to simultaneously transmit symbols over the at least N serial communication channels, and the simultaneous transmission is synchronized by the serial clock, and
wherein N is an integer greater than 1.

13. The system of claim 12, further comprising:
a first device and a second device, and
wherein the first device and the second device are operably coupled by the N-channel serial communication link.

14. The system of claim 13, wherein one or more of the first device and the second device comprises one of a microcontroller, a computer system, and a storage device.

15. An apparatus comprising a storage having machine executable code stored thereon, the machine executable code adapted for configuring a logic circuit such that the logic circuit may perform an N-channel serial communication of symbols, the N-channel serial communication of the symbols comprising:
setting data transmission by one or more first interface modules responsive to a serial clock of a second interface module to synchronize data transmission by the one or more first interface modules to data transmission by the second interface module;

enabling respective signal paths for carrying the serial clock from the second interface module to a clock input of each of the one or more first interface modules;

providing one or more first symbols to the one or more first interface modules;

providing a second symbol to the second interface module; and performing a parallel communication of the first symbols and the second symbol across an interconnect using the one or more first interface modules and the second interface module, wherein N is an integer greater than 1.

* * * * *